(12) United States Patent
Mitzlaff

(10) Patent No.: US 11,683,279 B2
(45) Date of Patent: *Jun. 20, 2023

(54) SYSTEM AND METHOD OF USING CONVERSATIONAL AGENT TO COLLECT INFORMATION AND TRIGGER ACTIONS

(71) Applicant: eBay Inc., San Jose, CA (US)

(72) Inventor: Joerg Mitzlaff, Berlin (DE)

(73) Assignee: eBay Inc., San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/366,855

(22) Filed: Jul. 2, 2021

(65) Prior Publication Data
US 2021/0336906 A1    Oct. 28, 2021

Related U.S. Application Data

(63) Continuation of application No. 16/397,611, filed on Apr. 29, 2019, now Pat. No. 11,102,152, which is a continuation of application No. 12/019,128, filed on Jan. 24, 2008, now Pat. No. 10,320,717.

(51) Int. Cl.
| | |
|---|---|
| *H04L 51/04* | (2022.01) |
| *G06Q 30/06* | (2023.01) |
| *H04L 65/1066* | (2022.01) |
| *G06F 16/2457* | (2019.01) |
| *G06F 16/332* | (2019.01) |

(Continued)

(52) U.S. Cl.
CPC ........ *H04L 51/04* (2013.01); *G06F 16/24573* (2019.01); *G06F 16/3329* (2019.01); *G06Q 30/0601* (2013.01); *G06Q 30/0613* (2013.01); *G06Q 30/08* (2013.01); *H04L 65/1066* (2013.01); *G06Q 30/0617* (2013.01); *G06Q 30/0619* (2013.01)

(58) Field of Classification Search
None
See application file for complete search history.

(56) References Cited

U.S. PATENT DOCUMENTS

| | | |
|---|---|---|
| 5,974,398 A | 10/1999 | Hanson et al. |
| 5,987,610 A | 11/1999 | Franczek et al. |
| 6,070,149 A | 5/2000 | Tavor |

(Continued)

OTHER PUBLICATIONS

Final Office Action Received for U.S. Appl. No. 16/397,611, dated Feb. 3, 2021, 21 pages.

(Continued)

*Primary Examiner* — Nicholas D Rosen
(74) *Attorney, Agent, or Firm* — Holland & Hart LLP

(57) ABSTRACT

Example embodiments provide a system that uses a conversational agent to collect information and publish the information on a network. A computer-implemented conversational agent establishes a communication session with a user and receives conversational information via a simulated conversation between the user and the computer-implemented conversational agent via the communication session, whereby the conversational information comprises information to be published. The computer-implemented conversational agent also receives, via a graphical user interface, an upload of an image that is associated with the information to be published. The computer-implemented conversational agent then causes publication of the information to be published and the uploaded image.

20 Claims, 9 Drawing Sheets

(51) Int. Cl.
*G06Q 30/08* (2012.01)
*G06Q 30/0601* (2023.01)

(56) References Cited

U.S. PATENT DOCUMENTS

| | | | |
|---|---|---|---|
| 6,073,142 | A | 6/2000 | Geiger et al. |
| 6,346,952 | B1 | 2/2002 | Shtivelman |
| 6,460,050 | B1 | 10/2002 | Pace et al. |
| 6,556,951 | B1 | 4/2003 | Deleo et al. |
| 6,907,571 | B2 | 6/2005 | Slotznick |
| 7,289,623 | B2 | 10/2007 | Lurie |
| 7,466,806 | B2 | 12/2008 | Espejo et al. |
| 7,472,077 | B2 | 12/2008 | Roseman et al. |
| 7,542,902 | B2 | 6/2009 | Scahill |
| 7,882,258 | B1 | 2/2011 | Sumler et al. |
| 8,401,710 | B2 | 3/2013 | Budhraja et al. |
| 8,694,379 | B2 | 4/2014 | Wiseman et al. |
| 10,320,717 | B2 | 6/2019 | Mitzlaff |
| 11,102,152 | B2 | 8/2021 | Mitzlaff |
| 2001/0029455 | A1 | 10/2001 | Chin et al. |
| 2001/0033298 | A1 | 10/2001 | Slotznick |
| 2002/0072974 | A1 | 6/2002 | Pugliese et al. |
| 2002/0091582 | A1 | 7/2002 | Palmer et al. |
| 2002/0094074 | A1 | 7/2002 | Lurie |
| 2002/0120554 | A1 | 8/2002 | Vega |
| 2004/0228457 | A1 | 11/2004 | Espejo et al. |
| 2005/0197846 | A1 | 9/2005 | Pezaris et al. |
| 2006/0098803 | A1 | 5/2006 | Bushey |
| 2006/0181736 | A1 | 8/2006 | Quek et al. |
| 2006/0277145 | A1 | 12/2006 | Raccah |
| 2006/0282317 | A1 | 12/2006 | Rosenberg |
| 2006/0291411 | A1 | 12/2006 | Varland |
| 2007/0067172 | A1 | 3/2007 | Lee et al. |
| 2007/0122062 | A1 | 5/2007 | Jacobs |
| 2008/0010113 | A1 | 1/2008 | Lanter et al. |
| 2008/0183574 | A1 | 7/2008 | Nash et al. |
| 2008/0215456 | A1 | 9/2008 | West et al. |
| 2008/0288338 | A1 | 11/2008 | Wiseman et al. |
| 2009/0106040 | A1 | 4/2009 | Jones |
| 2009/0112845 | A1 | 4/2009 | Byers |
| 2009/0138380 | A1 | 5/2009 | Roseman et al. |
| 2009/0193123 | A1 | 7/2009 | Mitzlaff |
| 2010/0256999 | A1 | 10/2010 | Ghani |
| 2011/0219087 | A1 | 9/2011 | Jorasch |
| 2014/0317193 | A1 | 10/2014 | Mitzlaff |
| 2019/0253369 | A1 | 8/2019 | Mitzlaff |

OTHER PUBLICATIONS

Non Final Office Action Received for U.S. Appl. No. 16/397,611, dated Oct. 6, 2020, 17 pages.
Notice of Allowance received for U.S. Appl. No. 16/397,611, dated May 4, 2021, 10 pages.
Jones, Specification of U.S. Appl. No. 60/982,065, filed Oct. 23, 2007, 23 pages.
Advisory Action received for U.S. Appl. No. 12/019,128, dated Jun. 4, 2015, 5 pages.
Graesser et al., "Intelligent Tutoring Systems with Conversational Dialogue", Retrieved from the internet URL: <https://pdfs.semanticscholar.org/cf3d/a99f5252beaf8b043d5c309fef5c88be2f5c.pdf>, 2001, pp. 39-52.
Decision on Appeal Brief Request for U.S. Appl. No. 12/019,128, mailed on Mar. 29, 2018, 8 pages.
Examiner's Answer to Appeal Brief received for U.S. Patent. U.S. Appl. No. 12/019,128, mailed on Nov. 17, 2015, 19 pages.
Final Office Action received for U.S. Patent. U.S. Appl. No. 12/019,128, dated Apr. 11, 2013, 16 pages.
Final Office Action received for U.S. Appl. No. 12/019,128, dated Mar. 25, 2015, 8 pages.
Final Office Action received for U.S. Appl. No. 12/019,128, dated Sep. 8, 2011, 14 pages.
Non-Final Office Action received for U.S. Appl. No. 12/019,128, dated Apr. 8, 2011, 16 pages.
Non-Final Office Action received for U.S. Appl. No. 12/019,128, dated Jun. 21, 2018, 28 pages.
Non-Final Office Action received for U.S. Appl. No. 12/019,128, dated Nov. 6, 2012, 15 pages.
Non-Final Office Action received for U.S. Appl. No. 12/019,128, dated Sep. 16, 2014, 6 pages.
Non-Final Office Action received for U.S. Appl. No. 12/019,128, dated Sep. 20, 2013, 14 pages.
Notice of Allowance received for U.S. Appl. No. 12/019,128, dated Apr. 11, 2014, 11 pages.
Notice of Allowance received for U.S. Appl. No. 12/019,128, dated Feb. 4, 2019, 13 pages.
Hein, "Soliloquy Data mines Customer Conversations", Retrieved from Internet URL: <www.soliquoy.com/news>, May 18, 2000, 1 page.
Final Office Action received for U.S. Appl. No. 14/318,636, dated Jul. 18, 2017, 37 pages.
Non-Final Office Action received for U.S. Appl. No. 14/318,636, dated Mar. 20, 2017, 24 pages.
Admiral Metals,"Reflecting on the History of Customer Service", Retrieved from the Internet URL: <https://www.admiralmetais.com/admiral-care/reflecting-history-customer-service/>, Accessed on Mar. 26, 2015, Dec. 10, 2014, 2 pages.
Anonymous, "Auction Pal Debuts Next-Generation Online Seller Service in Boston", Business Wire, New York, Sep. 10, 2007, 2 pages.

SYSTEM AND METHOD OF USING CONVERSATIONAL AGENT TO COLLECT INFORMATION AND TRIGGER ACTIONS

CROSS-REFERENCE TO RELATED APPLICATIONS

This application is a continuation of U.S. patent application Ser. No. 16/397,611 by Mitzlaff, entitled "System and Method of Using Conversational Agent to Collect Information and Trigger Actions", filed Apr. 29, 2019; which is a continuation of U.S. patent application Ser. No. 12/019,128 by Mitzlaff, entitled "System and Method of Using Conversational Agent to Collect Information and Trigger Actions", filed Jan. 24, 2008, now U.S. Pat. No. 10,320,717, issued Jun. 11, 2019; each of which is incorporated herein by reference in its entirety.

FIELD

This application relates generally to data processing, and more specifically to a system and method of using a conversational agent to collect information and trigger actions.

BACKGROUND

While electronic forms may provide a reliable tool for receiving information from participants of an electronic marketplace, the forms may be cumbersome to use. Multiple electronic forms may be required to be filled in order to list an offering on an electronic marketplace may discourage users, especially the ones engaging in irregular listings of inexpensive items. Additionally, electronic forms may be inflexible, requiring users to provide information in a certain formal way or requiring users to choose from certain predetermined options.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
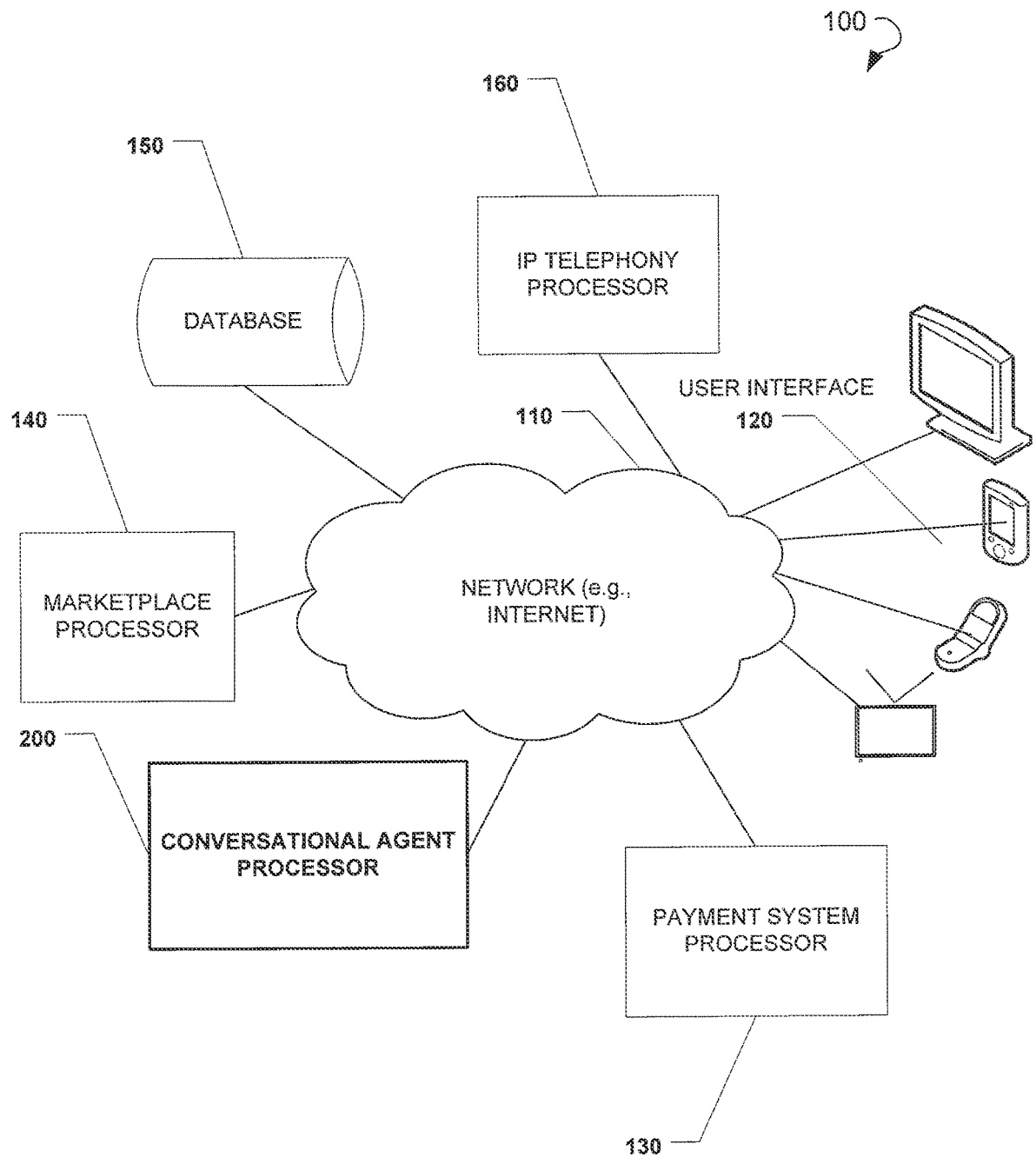
FIG. 1 is a block diagram showing architecture within which a system and method of using a conversational agent to collect information and trigger actions are implemented, in accordance with an example embodiment.

For some example embodiments, a system and method of using a conversational agent to collect information related to a marketplace offering are described. In the context of the electronic marketplace, the system and method may be utilized to increase participation in the marketplace by users who may find it too cumbersome for their transactions. The system and method may reduce the overhead created by multiple forms to be filled in order for users to engage in marketplace transactions. In some example embodiments, the system and method may allow users to utilize their existing marketplace accounts in a simplified process of collection of data related to a marketplace offering.

Accordingly, the method includes a simplified process of listing items at an electronic marketplace. In some example embodiments, the simplified process uses an interface that may differ from the typical electronic marketplace interface. To facilitate the simplified process of listing items, an intelligent agent may be used to elicit information from users. An intelligent conversational agent may be represented by computer programs designed to simulate an intelligent conversation. An intelligent conversational agent (also referred to as a "chatterbot") may be utilized in communications with the users to receive such information.

In some example embodiments, different characters or avatars may be utilized to represent an intelligent agent engaging in communications with users in order for the communication process to appear more human-like. Users may be allowed to select an avatar based on the avatar's appearance, story, or language of communication. Other criteria may also be used. The avatars may be utilized to make the communication more personal. In some example embodiments, while communicating with the users by way of an avatar, the intelligent conversational agent may correct users' statements, ask questions, and correct users' responses to the questions.

In some example embodiments, the users may be asked to provide related application access credentials to facilitate user data collection. The related applications may provide additional services to the users in order to facilitate listing and the consequent transaction process. Application Programming Interfaces (APIs) generally available to the applications related to the marketplace may be made available in order to facilitate the process. Accordingly, the user accounts from various applications may be linked and APIs made available to facilitate the data exchange. APIs of Internet Protocol (IP) telephony (e.g. SKYPE™), and an electronic payment system (e.g. PAYPAL®) may be utilized by the intelligent agent. As an example, the link may enable informing the user when a payment made for the listing is received.

In some example embodiments, the system may lack the typical features available to users of a typical electronic marketplace. However, the simplified process employed by the system may be useful in attracting a group of users not selling items on a regular basis. Users may find it convenient to fill fewer forms. Additionally, the technology may be more attractive to younger users who are more adept at using instant messengers to communicate data than in using forms of a typical electronic marketplace.

As already mentioned above, the technology may use different images to represent virtual characters behind the conversational agent, making the interaction more exciting for the users. In some example embodiments, the way different avatars interact with users may vary according to avatars' perceived personality differences expressed in different conversational styles while eliciting information. In some embodiments, avatars may not actually differ in the way they interact with users despite their appearance. The avatars may ask questions and respond to statements based on the statements provided by users, thus maintaining the dialog until sufficient listing information is gathered.

As an example, a user may come to the electronic marketplace, log in and enter some information about the item he would like to sell. Because his various accounts may already be linked as described above, the method may utilize these accounts to allow using their features in the technology. In some example embodiments, the intelligent agent may be implemented in the already existing architecture. However, the way in which the information is gathered for the purpose of listing on the electronic marketplace is different because it utilizes an intelligent conversational agent to collect information related to marketplace listings.

In some example embodiments, a speech-to-text or some other speech detection technology may be utilized to receive user input. Upon receiving auditory input and converting it into text, the intelligent conversational agent may be utilized to interact with the user as if the input were received by a user typing it into the intelligent conversational agent user interface. In some example embodiments, a user may upload images related to the listing by dragging and dropping the images onto the user interface. Subsequently, the images of offerings may be listed and posted along with the other information gathered by the conversational agent. In some example embodiments, an existing instant messenger or IP telephony application may be utilized to facilitate interaction between users and the conversational agent.

Thus, the system may utilize a conversational agent to interact with dynamic electronic applications to constitute an intelligent way to interact between the system and users and perform actions at the site of the electronic application. The technology may also allow taking actions based on the information received and list marketplace offerings using IP telephony bots. An example network environment 100 in which the system and method of using a conversational agent may be implemented is illustrated in FIG. 1.

As shown in FIG. 1, the network environment 100 may include a network 110, a user interface 120, a payment system processor 130, a marketplace processor 140, a database 150, and an IP telephony processor 160. The network 110 may be a network of data processing nodes that are interconnected for the purpose of data communication.)

The user interface 120, shown in the context of the network environment 100, may be configured to allow users to interact with the conversational agent processor 200 via the network 110. The user interface 120 may be configured to allow users to interact with the conversational agent 206 described below with reference to FIG. 2. The user interface 120 may include a Graphical User Interface (GUI). In a typical GUI, instead of offering only text menus or requiring typed commands, graphical icons, visual indicators or special graphical elements called "widgets may be utilized to allow user to interact with the conversational agent 206. The user interface 120 may be configured to utilize icons used in conjunction with text, labels or text navigation to fully represent the information and actions available to users.

The payment system processor 130, in some example embodiments, may be configured to process payments made by users while transacting within the context of an electronic marketplace. Thus, after the sale of a listed offering is completed, the payment system processor 130 may be configured to allow the buyer to pay the seller. The payment system processor 130 may be an e-commerce business configured to allow payments and money transfers to be made through the Internet. The payment system processor 130 may be configured to serve as an electronic alternative to traditional paper methods such as checks and money orders. The payment processor 130 may be configured to perform payment processing for individuals, online vendors, auction sites, or other corporate users engaged in transaction on the electronic marketplace.

The marketplace processor 140, in some example embodiments, is an online auction and shopping website engine behind an electronic marketplace configured to allow individual users and businesses to buy and sell goods and services (e.g. eBay). The marketplace processor 140 may be configured to process transactions of an electronic marketplace using conventional forms to gather user and electronic marketplace offerings. In the context of the network environment 100, the marketplace processor 140 may be configured to process listed marketplace offerings based on the information provided by users via the conversational agent 206.

The database 150, in some example embodiments may be configured as a structured collection of records or data that is stored in a computer system so that a computer program or person using a query language may consult it to answer queries. The records retrieved in answer to queries are information that can be used to make decisions. The database 150 may include user login and profile information. Additionally, the database 150 may include offering information described in greater detail with reference to FIG. 8 below.

The IP telephony processor 160, in some example embodiments, may be configured to establish communication between users and the conversational agent 206 via textual or auditory means. In some example embodiments, the IP telephony processor 160 is a computer program that allows users to make telephone calls over the Internet to other users, or to landlines and mobile telephones. Additional features of the IP telephony processor 160 may include instant messaging, file transfer, short message service, and video communications.

Figure 2:
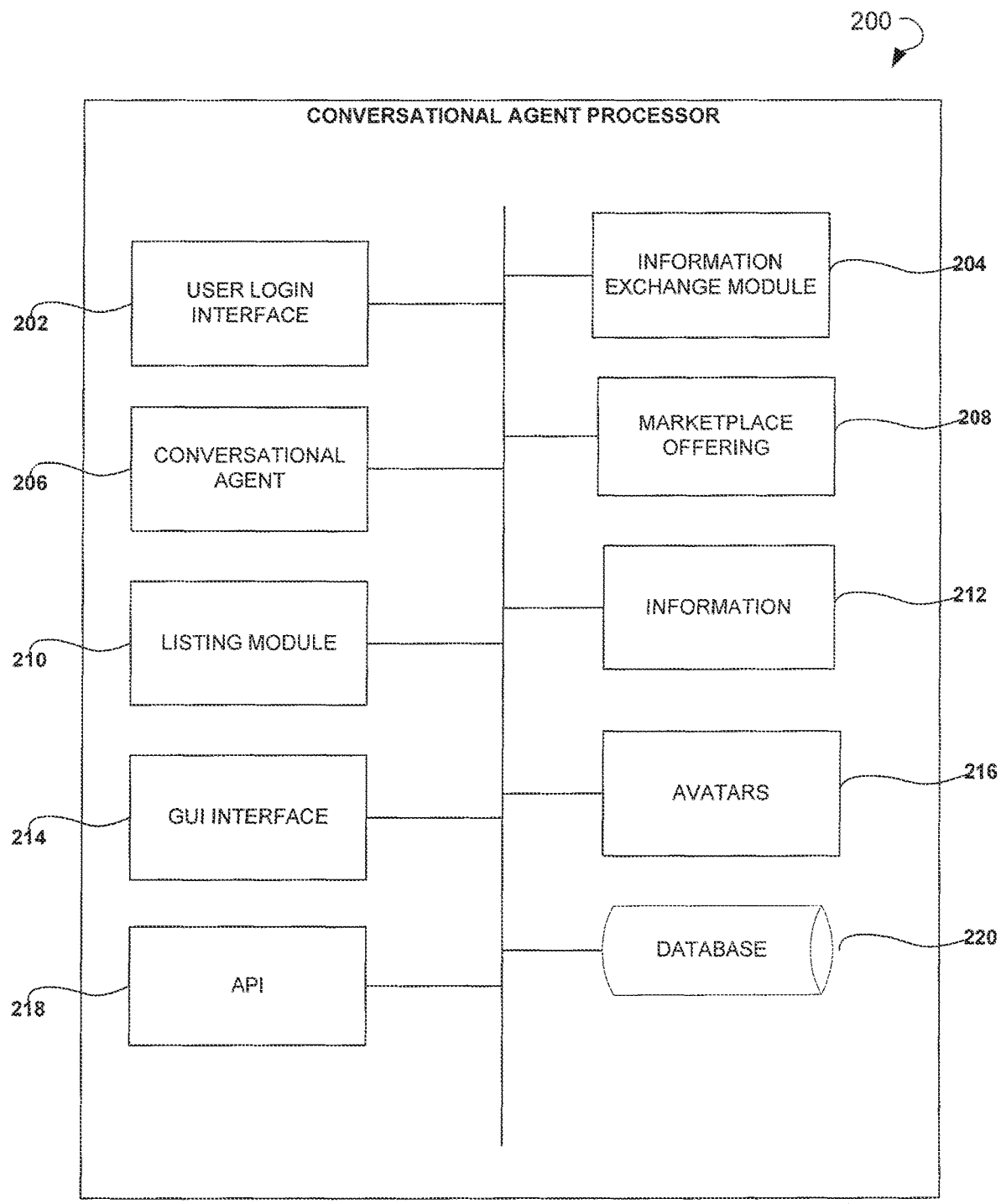
FIG. 2 is a block diagram showing a conversational agent system to collect information, in accordance with an example embodiment.

FIG. 2 is a block diagram of an example conversational agent processor, in accordance with one example embodiment. The conversational agent processor 200, in some example embodiments, includes a user login interface 202, an information exchange module 204, a conversational agent 206, marketplace offering parameters 208, a listing module 210, conversational information 212, GUI interface 214, avatars 216, an API 218, and a database 220.

The user login interface 202 may be configured to allow users to interact with the conversational agent 206. The interaction between users and the conversational agent 206 may be performed through direct manipulation of the graphical elements of the user login interface 202. The information exchange module 204, in some example embodiments, may be configured to allow users to engage in a process of exchanging information between users and the conversational agent 206.

Users, utilizing the information exchange module 204, may send and receive information from the conversational agent processor 200. Since the communication process may require that all parties understand a common language that is exchanged with each other, the conversational agent processor 200, in some example embodiments, may be able to communicate in different languages. In some example embodiments, the communication agent processor may be configured to determine a preferred language of the communication from the information received from users. In some example embodiments, users may explicitly select the language of the communication. The information exchange module 204 is not limited to a specific form of such exchange and may include auditory means of information exchange, such as speaking, nonverbal, physical means, such as body language, sign language, paralanguage, touch, eye contact, or the use of writing.

The conversational agent 206, in some example embodiments, may be configured as a computer program designed to simulate an intelligent conversation with one or more users via auditory, textual, or other methods of information exchange. Although the conversational agent 206 may appear to be intelligently interpreting the user input prior to providing a response, in some example embodiments, it may simply scan for keywords within the input and provide a reply with the most matching keywords or the most similar wording pattern from the database 220.

Thus, the conversational agent 206 may not be required to maintain a meaningful dialog by attempting to have a good understanding of a conversation. Instead, the conversational agent 206 may be configured to converse by recognizing cue words or phrases from the user. This may allow the conversational agent 206 to use pre-prepared or pre-calculated responses, which can move the conversation on in an apparently meaningful way without requiring them to know what users are talking about.

As an example, if a user types, "I am feeling very worried lately," the conversational agent 206 may be programmed to recognize the phrase "I am" and respond by replacing it with "Why are you" plus a question mark at the end, providing the answer, "Why are you feeling very worried lately?" A similar approach using keywords would be for the program to answer any comment, including a name of famous person, with "I think he is great, don't you?" In some example embodiments, a program implementing a conversational agent 206 may use other principles, including complex trained Artificial Intelligence (AI) algorithms. In some example embodiments, conversational agent processor 200 utilizes the conversational agent 206 purely for information retrieval purposes.

The avatars 216, mentioned above, may be configured as user selected or graphical characters provided by the conversational agent processor 200 whether in the form of a three-dimensional model, a two-dimensional icon, or a text construct found on early computer systems. The term "avatar" may refer to the personality connected with the screen name (e.g. Ted), or nickname of a user. The avatars 216 are utilized to represent a "personality" behind the conversational agent 206. The API 218 is a source code interface that an operating system or library provides to support requests for services to be made of it by computer programs. The API 218 may refer to the conversational agent processor API and any related applications.

Figure 3:
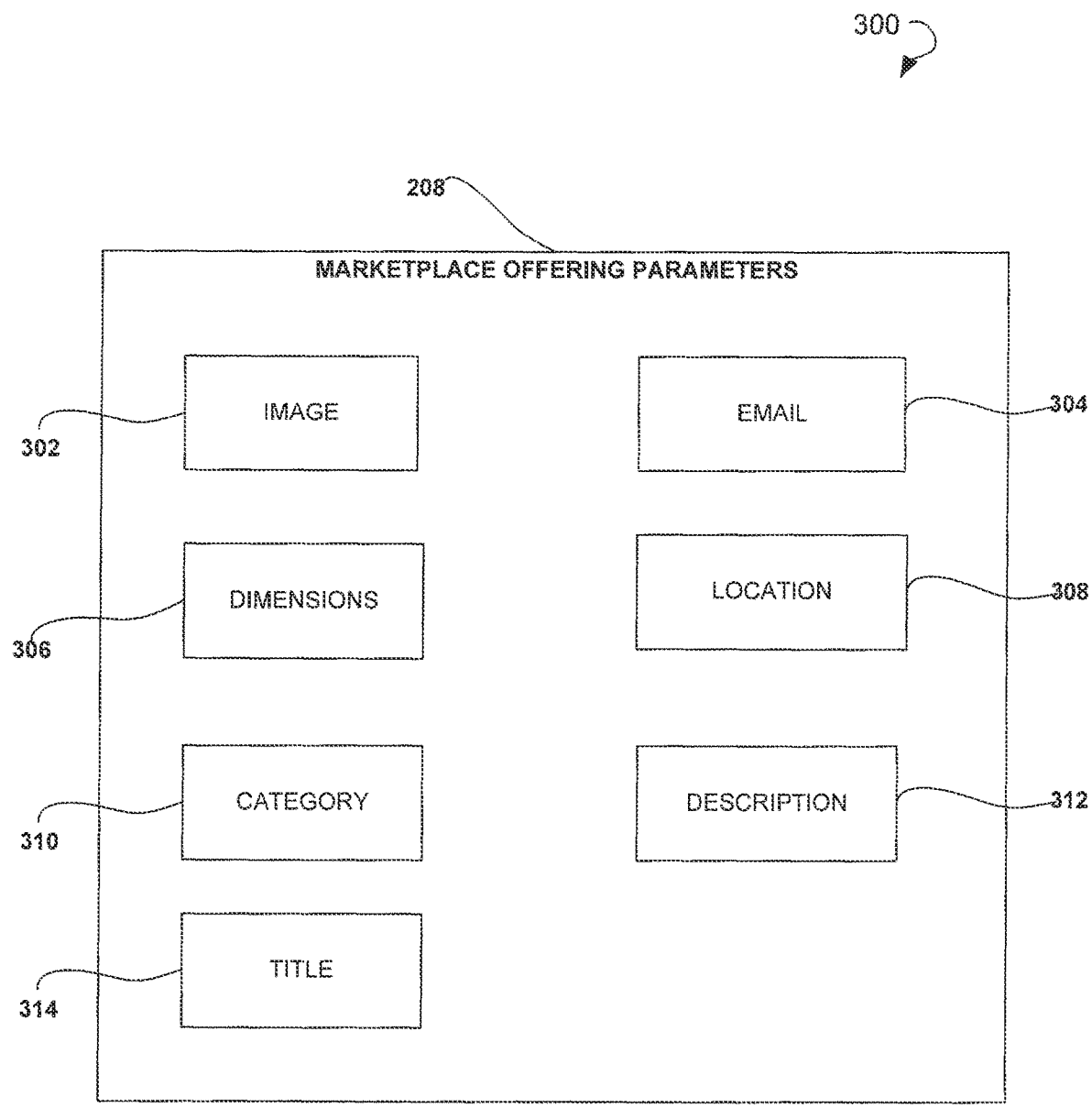
FIG. 3 is a block diagram showing a marketplace offering parameters, in accordance with an example embodiment.

Example marketplace offering parameters 208 are described with reference to FIG. 3. The marketplace offering parameters 208, in some example embodiments, are derived from the information collected by the conversational agent 206. The marketplace offering parameters 208 are determined by parsing the information received by the conversational agent 206. Thus, FIG. 3 is a block diagram 300 of the marketplace offering parameters, in accordance with one example embodiment. The marketplace offering parameters 208 may include an image 302, an email 304, dimensions 306, a location 308, a category 310, a description 312, and a title 314.

Figure 4:
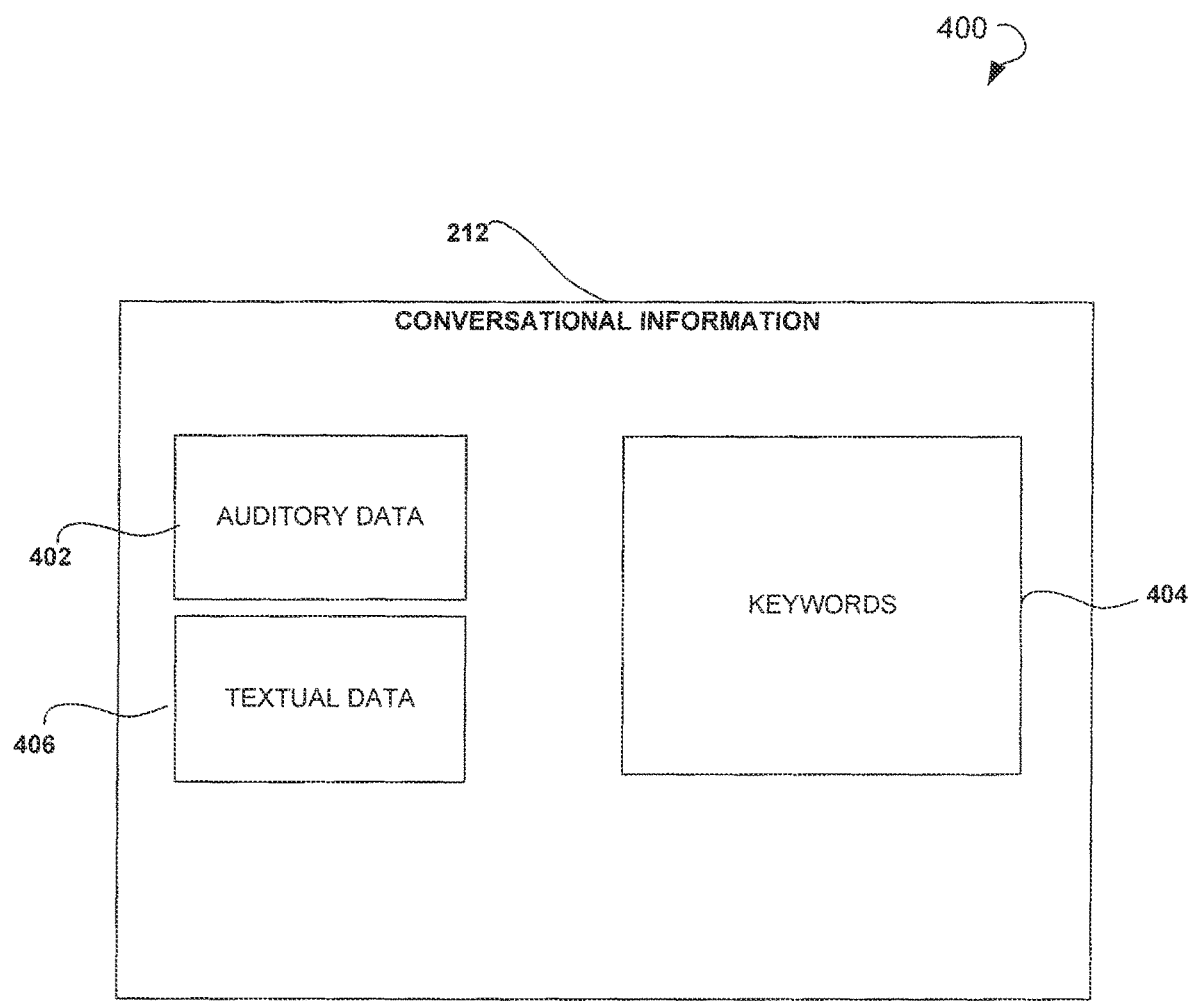
FIG. 4 is a block diagram showing conversational information, in accordance with an example embodiment.

The image 302, in some example embodiments, is an image or picture of the marketplace offering parameters 208. The image 302 may be captured using photography, using optical devices such as cameras. A user may then transfer the image 302 by dragging and dropping onto the GUI interface 214. Example conversational information 212 is described with reference to FIG. 4. FIG. 4 is a block diagram 400 of the conversational information 212, in accordance with one example embodiment. The conversational information 212 may include auditory data 402, textual data 406, and keywords 404. The auditory data 402, in some example embodiments, is a medium chosen to convey the message from users to conversational agent 206.

The keywords 404, in some example embodiments, is a word or concept with special significance, or it may be any word used as the key to a code or used in a reference work to link to other words or other information. An example communication to collect information using the keywords 404 that may occur between a user and the conversational agent 206 is described with reference to FIG. 2 above. An example method of using the conversational agent 206 to collect information may be described with reference to FIG. 5.

Figure 5:
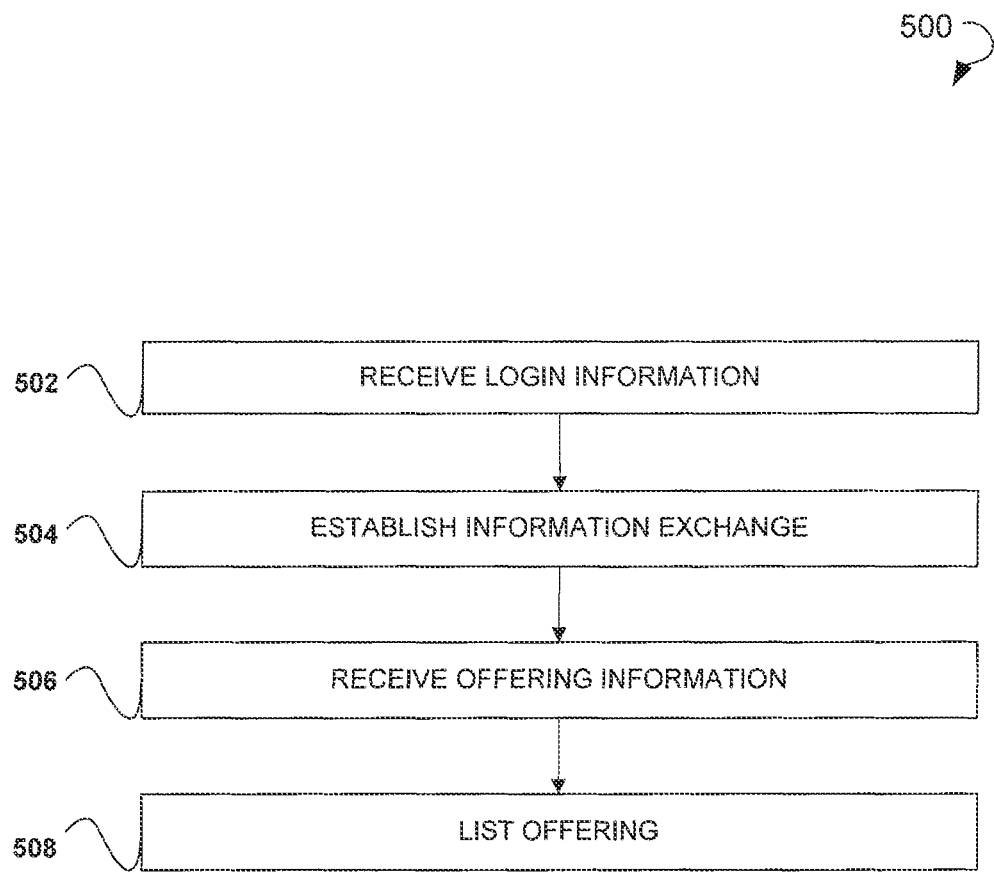
FIG. 5 is a flow chart showing a high level diagram of a method of using a conversational agent to collect information and trigger actions, in accordance with an example embodiment.

FIG. 5 is a high level flow chart of a method of using conversational agent 206 to collect conversational information 212 according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the conversational agent processor 200, illustrated in FIG. 2. The method 500 may be performed by the various modules discussed above with reference to FIG. 2. Each of these modules may comprise processing logic.

As shown in FIG. 5, the method 500 commences at operation 502, with receiving login information from the user login interface 202. The information received may include user credentials that allow the conversational agent processor 200 to authenticate the user against the database 150 and match the user to a relevant profile. At operation 504, the information exchange module 204 may establish information exchange between the user and the conversational agent 206 to collect the information related to a marketplace offering. At operation 506, the conversational agent 206 may receive conversational information related to the marketplace offering parameters 208. At operation 508, the listing module 210 may list the marketplace offering on an electronic marketplace based on the information gathered by the conversational agent 206.

An example method of using conversational agent to collect information, in greater detail, is described with reference to FIGS. 6 and 7. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the conversational agent processor 200 illustrated in FIG. 2. The method 600 may be performed by the various modules discussed above with reference to FIG. 2. Each of these modules may comprise processing logic.

Figure 6:
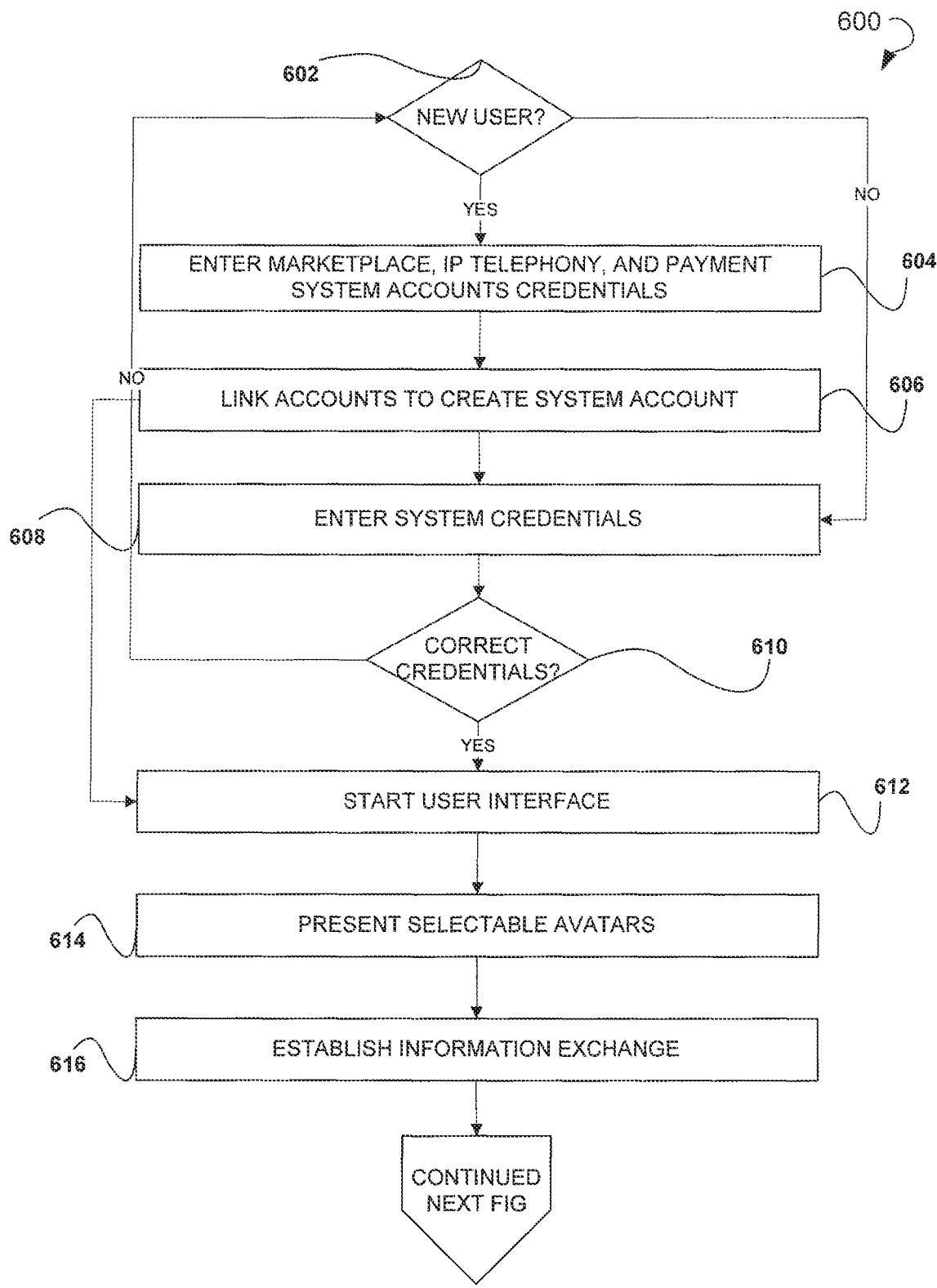
FIG. 6 is a flow chart showing a method of using a conversational agent to collect information and trigger actions, in accordance with an example embodiment.
Figure 7:
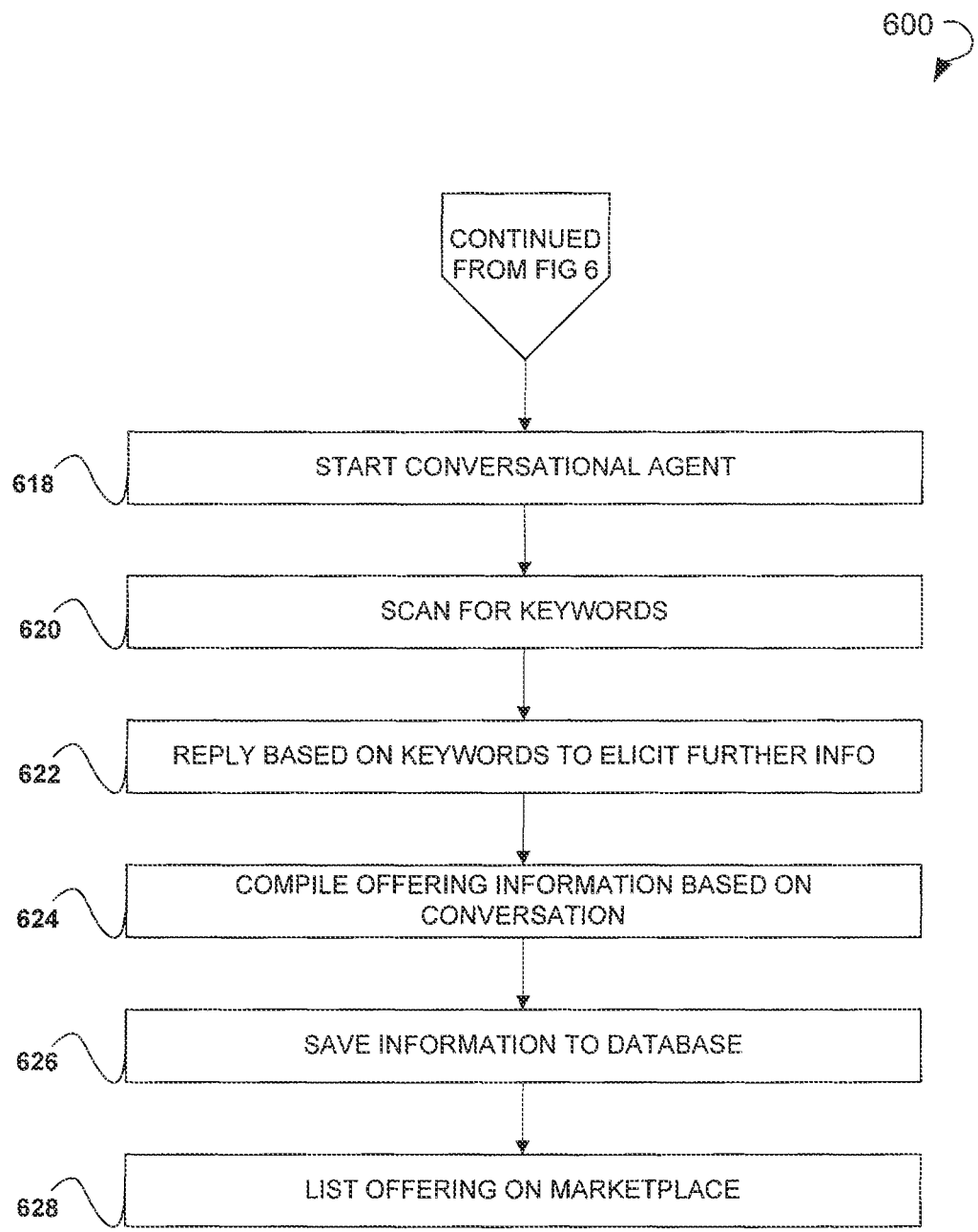
FIG. 7 is a flow chart showing a method of using a conversational agent to collect information and trigger actions continued from FIG. 6, in accordance with an example embodiment.

As shown in FIGS. 6 and 7, the method 600 may commence at decision block 602. At decision block 602, the conversational agent processor 200, through the user login interface 202, may determine whether the user is a new user. If it is determined at decision block 602 that the user is new, the user login interface 202 proceeds to ask the user to enter his credentials. In some example embodiments, the user may be enter marketplace processor 140 credentials, IP telephony processor 160 credentials, and the payment system processor 130 credentials.

The user login interface 202 may require the above credentials in order to create a common user account at operation 604. In some example embodiments, the user may enter one or more of the above mentioned sets of credentials in order to create a user account with the conversational agent processor 200. Accordingly, at operation 604, the user may enter the marketplace, IP telephony, and payment system account credentials, and at operation 606, the conversational agent processor 200 may link the accounts. The method 600 may then proceed to start a user interface at operation 612.

If, on the other hand, it is determined at decision block 602 that the user is not a new user, the method 600 may proceed by requiring the user to enter his conversational agent credentials at operation 608. The user may use the user login interface 202 to enter the conversational agent credentials, and at decision block 610, the conversational agent processor 200 may determine whether the entered credentials are correct. If it is determined at decision block 610 by the conversational agent processor 200 that the entered credentials are correct, then the method 600 may proceed to start the user interface at operation 612. If, on the other hand, it is determined at decision block 610 that the credentials are not correct, the method 600 may direct the user back to the decision block 602.

At operation 614, the user may be presented with selectable avatars to represent the conversational agent 206 while exchanging information with the user. Each avatar may include an associated description (e.g. biography) and a nickname. The user then may select an avatar. In some example embodiments, the user may be allowed to create a new avatar by selecting various options in the process. At operation 616, the information exchange module 204 may establish information exchange with the user initiating the conversational agent 206. At operation 618, the conversational agent 206 may be started by displaying a textual message or by making an auditory statement. In some example embodiments, the user may establish the communication with the conversational agent 206 by making a statement.

Once the communication is initiated by the information exchange module 204, the conversational agent 206 may scan for keywords at operation 620, and based on the keywords, at operation 622, reply to user messages in order to elicit further information if needed. At operation 624, the conversational agent 206 may compile offering information based on the exchange of the conversational information 212, and at operation 626, save information to database 150. Based on the collected conversational information 212, the listing module 210 may list the marketplace offering parameters 208 on the marketplace at operation 628.

Figure 8:
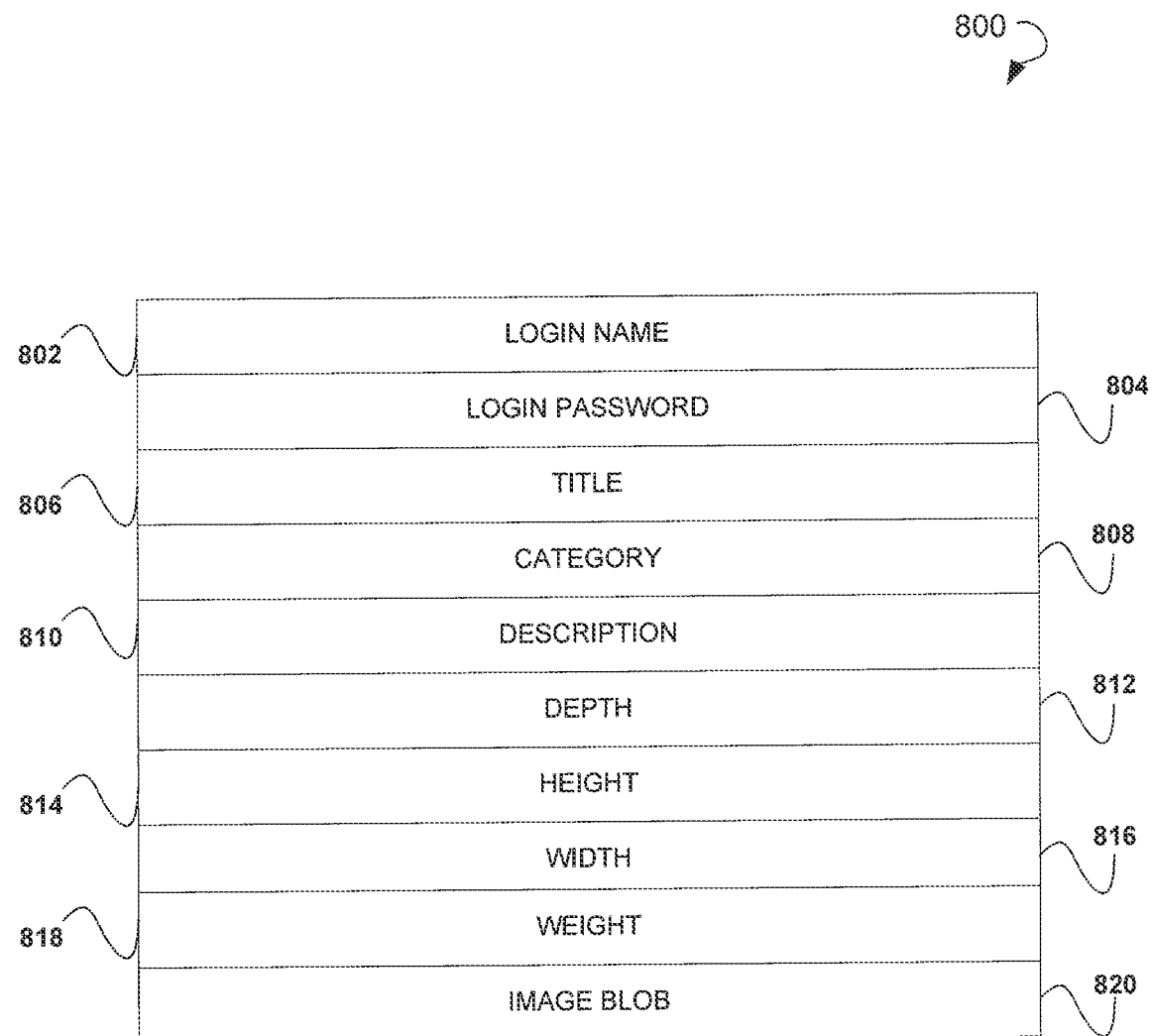
FIG. 8 is a diagrammatic representation of an example data record to represent offering information, in accordance with an example embodiment.

FIG. 8 illustrates, by way of example, a sample information record 800 of the database 150. The sample record 800 may, in some embodiments, include a user login name 802 and a user login password 804 allowing the conversational agent processor 200 to authenticate the user and to match the user to his profile. The sample record 800 may further include a title 806, a category 808, a description 810, a depth 812, a height 814, a width 816, a weight 818, and an image blob 820 related to the marketplace offering parameters 208.

Figure 9:
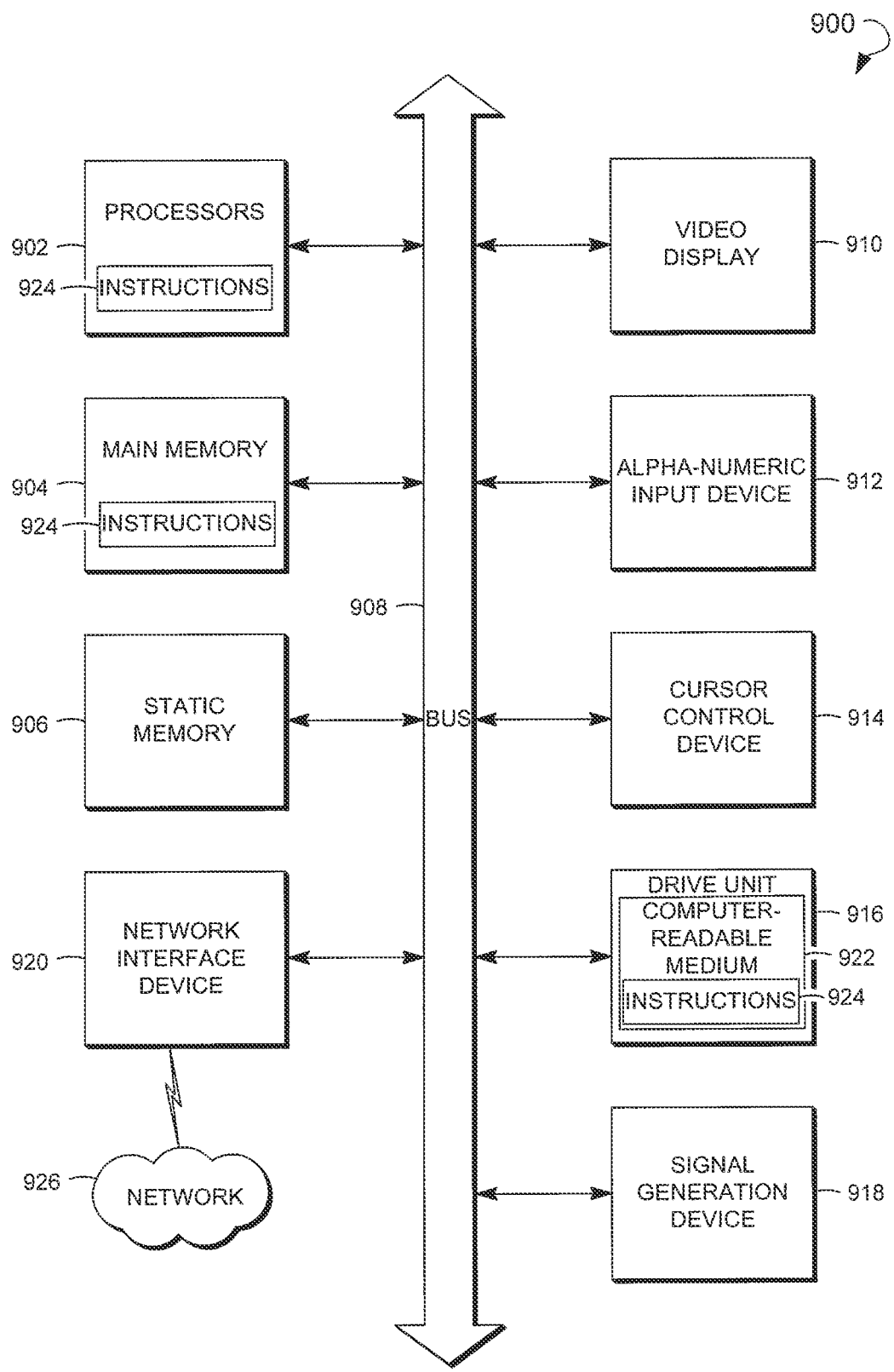
FIG. 9 is a diagrammatic representation of an example machine in the form of a computer system within which a set of instructions, for causing the machine to perform any one or more of the methodologies discussed herein, may be executed.

FIG. 9 shows a diagrammatic representation of a machine in the example electronic form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902 (e.g., a central processing unit (CPU), a graphics processing unit (GPU), or both), and a main memory 904 and a static memory 906, which communicate with each other via a bus 908. The computer system 900 may further include a video display unit 910 (e.g., a liquid crystal display (LCD) or a cathode ray tube (CRT)). The computer system 900 may also include an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a computer-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 may also constitute machine-readable media.

The instructions 924 may further be transmitted or received over a network 926 via the network interface device 920 utilizing any one of a number of well-known transfer protocols (e.g., Hyper Text Transfer Protocol (HTTP)).

While the computer-readable medium 922 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a system and method of using a conversational agent to collect information have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method comprising:
   scanning, by one or more processors, a first message of a sequence of messages exchanged between a user device and a computer-implemented conversational agent to identify one or more keywords;
   communicating a second message of the sequence of messages to the user device that is responsive to the first message based at least in part on the one or more keywords;
   parsing, by the one or more processors, the sequence of messages to obtain a plurality of values corresponding to a plurality of marketplace parameters;
   generating a listing comprising the plurality of values corresponding to the plurality of marketplace parameters; and
   causing publication, on a network, of the listing.

2. The method of claim 1, further comprising:
   receiving, from the user device, an image associated with the listing, wherein generating the listing comprises generating the listing comprising the image associated with the listing and the plurality of values corresponding to the plurality of marketplace parameters.

3. The method of claim 1, further comprising:
   identifying one or more matching keywords in response to the one or more keywords included in the first message, wherein communicating the second message comprises communicating the second message comprising the one or more matching keywords.

4. The method of claim 1, further comprising:
   receiving, from the user device, a user credential prior to receiving the first message of the sequence of messages exchanged between the user device and the computer-implemented conversational agent; and
   establishing a communication session between the user device and the computer-implemented conversational agent in response to authenticating the user credential.

5. The method of claim 1, further comprising:
   communicating one or more additional messages between the user device and the computer-implemented conversational agent based at least in part on the plurality of values and the plurality of marketplace parameters.

6. The method of claim 1, wherein exchange of the sequence of messages is established via an Internet telephony system or an instant messenger.

7. The method of claim 1, wherein the plurality of marketplace parameters comprises at least one of a category, a description, a title, or a combination thereof.

8. A system comprising:
   a processor; and
   a memory device storing instructions which, when executed by the processor, causes the system to perform operations comprising:
      scanning a first message of a sequence of messages exchanged between a user device and a computer-implemented conversational agent to identify one or more keywords;
      communicating a second message of the sequence of messages to the user device that is responsive to the first message based at least in part on the one or more keywords;
      parsing the sequence of messages to obtain a plurality of values corresponding to a plurality of marketplace parameters;
      generating a listing comprising the plurality of values corresponding to the plurality of marketplace parameters; and
      causing publication, on a network, of the listing.

9. The system of claim 8, wherein the processor, when executing the instructions, causes the system to perform operations comprising:
   receiving, from the user device, an image associated with the listing, wherein generating the listing comprises generating the listing comprising the image associated with the listing and the plurality of values corresponding to the plurality of marketplace parameters.

10. The system of claim 8, wherein the processor, when executing the instructions, causes the system to perform operations comprising:
    identifying one or more matching keywords in response to the one or more keywords included in the first message, wherein communicating the second message comprises communicating the second message comprising the one or more matching keywords.

11. The system of claim 8, wherein the processor, when executing the instructions, causes the system to perform operations comprising:
    receiving, from the user device, a user credential prior to receiving the first message of the sequence of messages exchanged between the user device and the computer-implemented conversational agent; and
    establishing a communication session between the user device and the computer-implemented conversational agent in response to authenticating the user credential.

12. The system of claim 8, wherein the processor, when executing the instructions, causes the system to perform operations comprising:
    communicating one or more additional messages between the user device and the computer-implemented conversational agent based at least in part on the plurality of values and the plurality of marketplace parameters.

13. The system of claim 8, wherein exchange of the sequence of messages is established via an Internet telephony system or an instant messenger.

14. The system of claim 8, wherein the plurality of marketplace parameters comprises at least one of a category, a description, a title, or a combination thereof.

15. A non-transitory computer-readable medium comprising instructions which, when read by a machine, cause the machine to perform operations comprising:
- scanning a first message of a sequence of messages exchanged between a user device and a computer-implemented conversational agent to identify one or more keywords;
- communicating a second message of the sequence of messages to the user device that is responsive to the first message based at least in part on the one or more keywords;
- parsing the sequence of messages to obtain a plurality of values corresponding to a plurality of marketplace parameters;
- generating a listing comprising the plurality of values corresponding to the plurality of marketplace parameters; and
- causing publication, on a network, of the listing.

16. The non-transitory computer-readable medium of claim 15, wherein the instructions further cause the machine to perform operations comprising:
- receiving, from the user device, an image associated with the listing, wherein generating the listing comprises generating the listing comprising the image associated with the listing and the plurality of values corresponding to the plurality of marketplace parameters.

17. The non-transitory computer-readable medium of claim 15, wherein the instructions further cause the machine to perform operations comprising:
- identifying one or more matching keywords in response to the one or more keywords included in the first message, wherein communicating the second message comprises communicating the second message comprising the one or more matching keywords.

18. The non-transitory computer-readable medium of claim 15, wherein the instructions further cause the machine to perform operations comprising:
- receiving, from the user device, a user credential prior to receiving the first message of the sequence of messages exchanged between the user device and the computer-implemented conversational agent; and
- establishing a communication session between the user device and the computer-implemented conversational agent in response to authenticating the user credential.

19. The non-transitory computer-readable medium of claim 15, wherein the instructions further cause the machine to perform operations comprising:
- communicating one or more additional messages between the user device and the computer-implemented conversational agent based at least in part on the plurality of values and the plurality of marketplace parameters.

20. The non-transitory computer-readable medium of claim 15, wherein exchange of the sequence of messages is established via an Internet telephony system or an instant messenger.

\* \* \* \* \*